Nov. 21, 1933.  H. GEORGE  1,936,476
MANUFACTURE OF FUSED SILICA
Filed Jan. 5, 1928
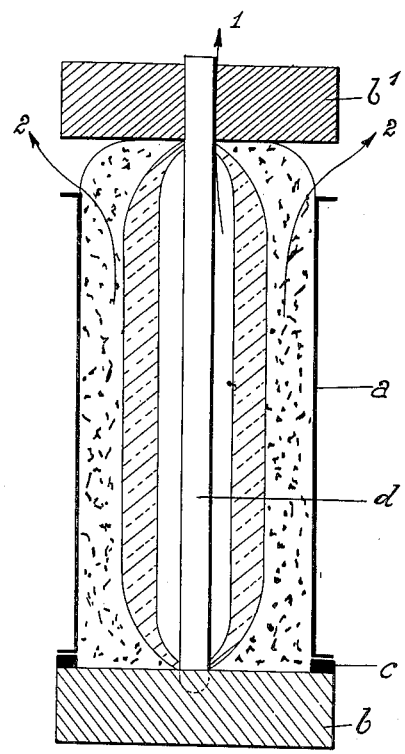
INVENTOR
HENRI GEORGE
BY HIS ATTORNEYS
Howson and Howson Patented Nov. 21, 1933

1,936,476

UNITED STATES PATENT OFFICE 1,936,476

MANUFACTURE OF FUSED SILICA

Henri George, Paris, France, assignor to Société Quartz & Silice, Paris, France, a corporation of France Application January 5, 1928, Serial No. 244,716, and in France January 5, 1927

1 Claim. (Cl. 49—78.1)

The present invention has for its object a process for the manufacture of fused silica which allows of obtaining a compact product containing neither free carbon nor free silicon, thereby affording an improvement in the physical qualities of the articles obtained and in their appearance. This process consists in maintaining an oxidizing atmosphere in the melting furnace during the formation of the ingot.

A very simple method of operation consists in incorporating with the charge, at the time when the latter is placed in the melting furnace, a certain quantity of water. In order to explain the action of the water during the fusion of the silica, in the presence of carbon, it is necessary to analyze the sequence of the phenomena which occur in melting furnaces.

The accompanying drawing represents diagrammatically, in sectional view, an axial-electrode furnace of a type in current use.

$a$ designates a metallic sheath or casing, $b$ a block of carbon forming the base of the furnace and serving as a current lead; this block $b$ is suitably insulated at $c$ from the metallic part of the furnace. $d$ designates the carbon electrode, which makes contact at one end with the block $b$ and at the other end with a carbon block $b'$.

The charge of silica, consisting for example of silicious sand, surrounds the electrode $d$ completely and fills the furnace. The upper block $b'$ rests upon the charge and is insulated thereby from the metallic sheath $a$. The passage of the current into the electrode $d$ raises the latter to a high temperature, which attains about 2000° C. in working.

At the beginning of the operation of fusion, when the temperature of the electrode reaches approximately 1400° C., the charge of silica commences to be reduced by the carbon of the electrode. Silicon is then formed and upon rise of temperature this silicon (which boils at 1600° C.) expands in the state of vapour into the pulverulent mass of silica, which has not yet begun to agglomerate, and condenses therein. Experiment shows that if the furnace is stopped at this moment, the whole charge is of a greyish colour.

Assuming that the temperature continues to rise, the silica agglomerates and melts around the electrode; at this moment the silicon in the vapour state and the carbon monoxide due to the reduction of the charge can no longer expand into the mass of the latter but escape along the electrode, being burnt in the air outside the furnace. There is thus an initial gaseous current or discharge, in the direction of the arrow 1, which forms in contact with the electrode and gives rise to the well known flame surmounting these furnaces in operation.

If the charge contains water in sufficient quantity, there is formed a second gaseous current or discharge through the pulverulent mass, in the direction of the arrows 2. The water is, in fact, vaporized and partially dissociated at high temperature in contact with the melting charge. This atmosphere produces a proportional oxidation of the free silicon which has been condensed in the charge, and reforms silica in place, this silica acting to cohere the grains of the charge before they undergo fusion.

It will be seen that the presence of water allows of ensuring that the melted charge contains no trace of free silicon. The same applies as regards carbon derived from the electrode, which may have spread into the charge, and as regards organic substances, which may have been mixed with the raw material.

It follows then that the incorporation of a certain quantity of water with the charge, in accordance with the present invention, before the introduction of the charge into the furnace, ensures an oxidizing atmosphere for the charge outside the hollow core or sleeve of molten silica, and permits the elimination from the fused material of all trace of silicon or carbon in the free state. The same result may be ensured by a circulation of air or oxygen but less simply than by the use of water.

The process according to the invention presents other advantages.

Oxidation in place of the silicon condensed in the charge leads to the formation of very finely divided silica which surrounds the grains of the charge before melting in its turn. This has the result of yielding a much whiter product of a characteristic snowy appearance, presenting greater compactness.

Thus by comparing two samples taken from rough ingots, without drawing or pressing, one made from dry sand and the other obtained in accordance with the present process, the following results are found:—

|  | Absolute density | Apparent density | Volume of the voids |
|---|---|---|---|
| Dry sand | 2.19 | 1.93 | 12% |
| Moist sand | 2.19 | 2 | 9% |

The process likewise increases by approximately 15 per cent the mechanical resistance to compression of the manufactured product.

The electrical properties are also improved, in particular the dielectric strength; the losses in a high frequency field are lower.

Lastly, it has been ascertained that the material works better mechanically and is adapted to take a higher polish. On the other hand, the process reduces slightly the quality of the material from the thermal point of view, by lowering the softening point under load by 50 to 100°.

The material obtained according to the process is therefore not suitable for the somewhat exceptional applications in which fused silica is utilized at temperatures higher than 1200° C. On the other hand it is quite suitable for chemical, mechanical and electrical applications.

The quantity of water to be incorporated with the charge, in order to obtain the above results, varies according to the dimensions of the furnaces or crucibles and according to the duration of the melting operations. On an average, and merely by way of example, there may be employed a quantity of water equal to about 2 per cent of the weight of the dry sand.

What I claim is:

The hereinbefore described method of fusing silica in a carbon resistor furnace, which comprises forming a mass of moist silica particles around the resistor and maintaining around the melting silica mass an envelope of the products resulting from the dissociation of the moisture contained in the mass.

HENRI GEORGE.